United States Patent [19]

Kanno

[11] Patent Number: 4,667,248
[45] Date of Patent: * May 19, 1987

[54] DOCUMENT IMAGE EDITING DEVICE

[75] Inventor: Masayuki Kanno, Fujisawa, Japan

[73] Assignee: Kabushiki Kaisha Toshiba, Kawasaki, Japan

[*] Notice: The portion of the term of this patent subsequent to Aug. 27, 2002 has been disclaimed.

[21] Appl. No.: 749,548

[22] Filed: Jun. 27, 1985

[30] Foreign Application Priority Data

Jun. 30, 1984 [JP] Japan ................................. 59-135935

[51] Int. Cl.$^4$ ............................................... H04N 1/40
[52] U.S. Cl. ..................................... 358/280; 358/287
[58] Field of Search ............... 358/285, 293, 294, 256, 358/280, 257, 75, 78, 287; 364/523

[56] References Cited

U.S. PATENT DOCUMENTS

| | | | |
|---|---|---|---|
| 4,231,069 | 10/1980 | Wellendorf et al. | 358/280 |
| 4,255,766 | 3/1981 | Matsuda et al. | 358/257 |
| 4,342,052 | 7/1982 | Rackley et al. | 358/256 |
| 4,498,107 | 2/1985 | Yoshimaru et al. | 358/256 |
| 4,538,183 | 8/1985 | Kanno et al. | 358/280 |
| 4,542,378 | 9/1985 | Suganuma et al. | 358/256 |

*Primary Examiner*—Michael A. Masinick
*Attorney, Agent, or Firm*—Oblon, Fisher, Spivak, McClelland & Maier

[57] ABSTRACT

A document image editing device has a page memory device and a display device. The page memory device stores in different areas thereof document images to be edited, image information (parts) of the cut partial image regions, and a pasteboard image for pasting the cut partial images. The display device displays the document images to be edited and the cut partial images in different display regions. The image editing is performed under the control of a CPU. In the cutting mode, partial images cut from the document images displayed on the display device are stored in memory locations of the corresponding areas of the memory device and are displayed at positions in the corresponding regions of the display device. In the pasting mode, the pasting positions of the cut partial images on the pasteboard are designated. The image information of the partial images is stored in the designated memory locations of the corresponding memory areas of the memory device and is displayed on the pasteboard on the display device. The pasteboard image on which the partial images are pasted in a desired layout is registered in a document image memory or printed out by a printer.

6 Claims, 24 Drawing Figures

FIG. 5A CUTTING LIST

| NAME OF PART | REGION | DOCUMENT NO. | MEMORY NO. |
|---|---|---|---|
| A | (S0, S1) | 1 | 6a |
|  |  |  |  |

FIG. 5B WORKING BOX LIST

| NAME OF PART | REGION | MEMORY NO. |
|---|---|---|
| A | (P0, P1) | 6b |
| α | (P2, P3) | 6b |
| γ | (P4, P5) | 6b |
|  |  |  |

FIG. 5C PASTING LIST

| NAME OF PART | REGION | MEMORY NO. |
|---|---|---|
| α | (D0, D1) | 6c |
| γ | (D2, D3) | 6c |
| A | (D4, D5) | 6c |
|  |  |  |

F I G. 7D
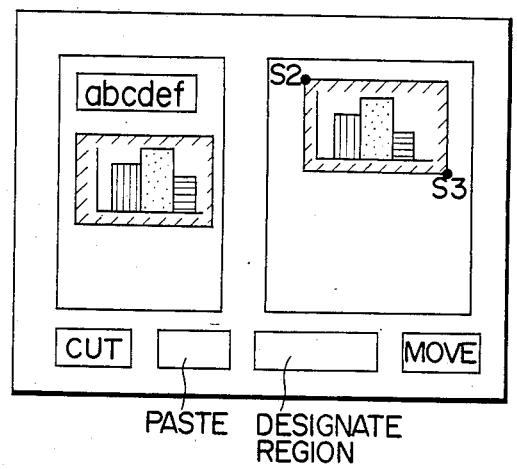
F I G. 7E
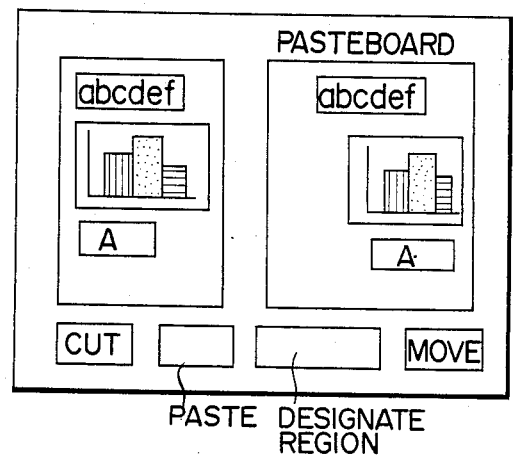

DOCUMENT IMAGE EDITING DEVICE

BACKGROUND OF THE INVENTION

The present invention relates to a cut and paste document image editing device.

Various electronic filing apparatuses have been recently developed. In such a filing apparatus, document image information is stored in a memory in the form of digital information. The information is displayed on a display device or is output as a hard copy, as needed. The amount of information is enormously large, and a large-capacity memory is required to allow handling of all information by a filing apparatus. In fact, since however, only a small amount of information is valuable, it is therefore very important to determine the information which is valuable. However, efficient information retrieval is generally difficult. In view of this, it is very important that necessary information be filed in a format which allows easy access.

According to conventional information arrangement works, desired image portions are manually cut from a plurality of documents, and the partial images are pasted on a single pasteboard. Pasteboards having such partial images pasted thereon are then filed.

In a conventional electronic filing apparatus, an editing instruction mark is directly depicted on a document or a special sheet. The editing instruction mark is read by a facsimile system, and an image region required for editing is cut out from the document. With this method, the editor must designate a cutting region and a pasting region. When such regions are directly designated on the document, the document is contaminated.

A document filing apparatus using an optical disk memory technique has been recently proposed. In this apparatus, a document for image cutting and a pasteboard for pasting the cut partial image thereon are displayed on a CRT. The cutting and pasting regions are designated with a pointing device such as a truck ball, a light pen or a mouse. With this apparatus, the document image to be cut and the pasteboard image are simultaneously displayed on a CRT display, and image editing between the document image and the pasteboard image is performed. Therefore, it is difficult to rearrange partial images cut from more than one document into a single document. In this case, it is particularly difficult to effectively lay out partial images cut from more than one document. Further, the modification of layout is also difficult. A problem remains in the flexibility in editing procedures.

A copending U.S., patent application Ser. No. 454,110 (now U.S. Pat. No. 4,538,183) entitled "IMAGE EDITING APPARATUS", filed on Dec. 28, 1982 and assigned to the same assignee as this application discloses an editing apparatus for cutting necessary partial images from a plurality of documents sequentially displayed on a CRT screen and for pasting the cut partial images on a single pasteboard. In this editing apparatus, a plurality of basic pasting patterns are programmed in advance. It is then decided which pattern can be adopted for the partial images. The partial images are enlarged or reduced as required, and automatically pasted in accordance with a pasting pattern.

SUMMARY OF THE INVENTION

It is an object of the present invention to provide an improved document image editing device.

It is another object of the present invention to provide a document image editing device capable of effectively editing document images cut from a plurality of documents, as a single document image.

It is still another object of the present invention to provide a document image editing device capable of performing flexible editing.

In order to achieve the above object of the present invention, a document image editing device comprises document providing means for providing documents to be edited and having partial images to be cut; a page memory device; a display device; output means for outputting edited image information; region designating means; and a processing unit.

The page memory device has a first memory area adapted for storing document image information to be edited which is provided by the document providing means, a second memory area adapted for storing partial images (parts) cut from the documents to be edited, and a third memory area adapted for storing pasteboard image information on which the partial images (parts) are to be pasted.

The display device has a first display region adapted for individually displaying the documents to be edited which are stored in the first memory area of the page memory device, a second display region adapted for displaying the partial images cut from the documents displayed on the first display region, and a third display region adapted for displaying the pasteboard image which is stored in the third memory area of the page memory device and on which the partial images displayed on the second display region are to be pasted.

The region designating means designates cutting regions of the partial images to be cut in the documents for editing displayed at the first display region of the display device, and pasting regions for pasting the cut partial images on the third display region.

In the cutting mode of editing processing, in response to the region designating means, the processing unit transfers, image information of the designated partial image regions on the first region of the display device, from the first memory area of the page memory device to a location of the second memory area thereof corresponding to the selected regions on the second display region of the display device. In the pasting mode, the processing unit transfers, the partial image information displayed on the second display region of the display device, from the second memory area of the page memory device to the third memory area thereof corresponding to the pasting regions on the third display region of the display device.

BRIEF DESCRIPTION OF THE DRAWINGS

FIG. 5A shows a cutting list prepared when partial images are cut;

FIG. 5B shows a list of cut partial images;

FIG. 5C shows a pasting list of partial images when they are pasted on a pasteboard;

FIGS. 7A to 7E are illustrations for explaining the operation of the device shown in FIG. 6 in accordance with transitions in the display screen.

DETAILED DESCRIPTION OF THE PREFERRED EMBODIMENTS

Figure 1:
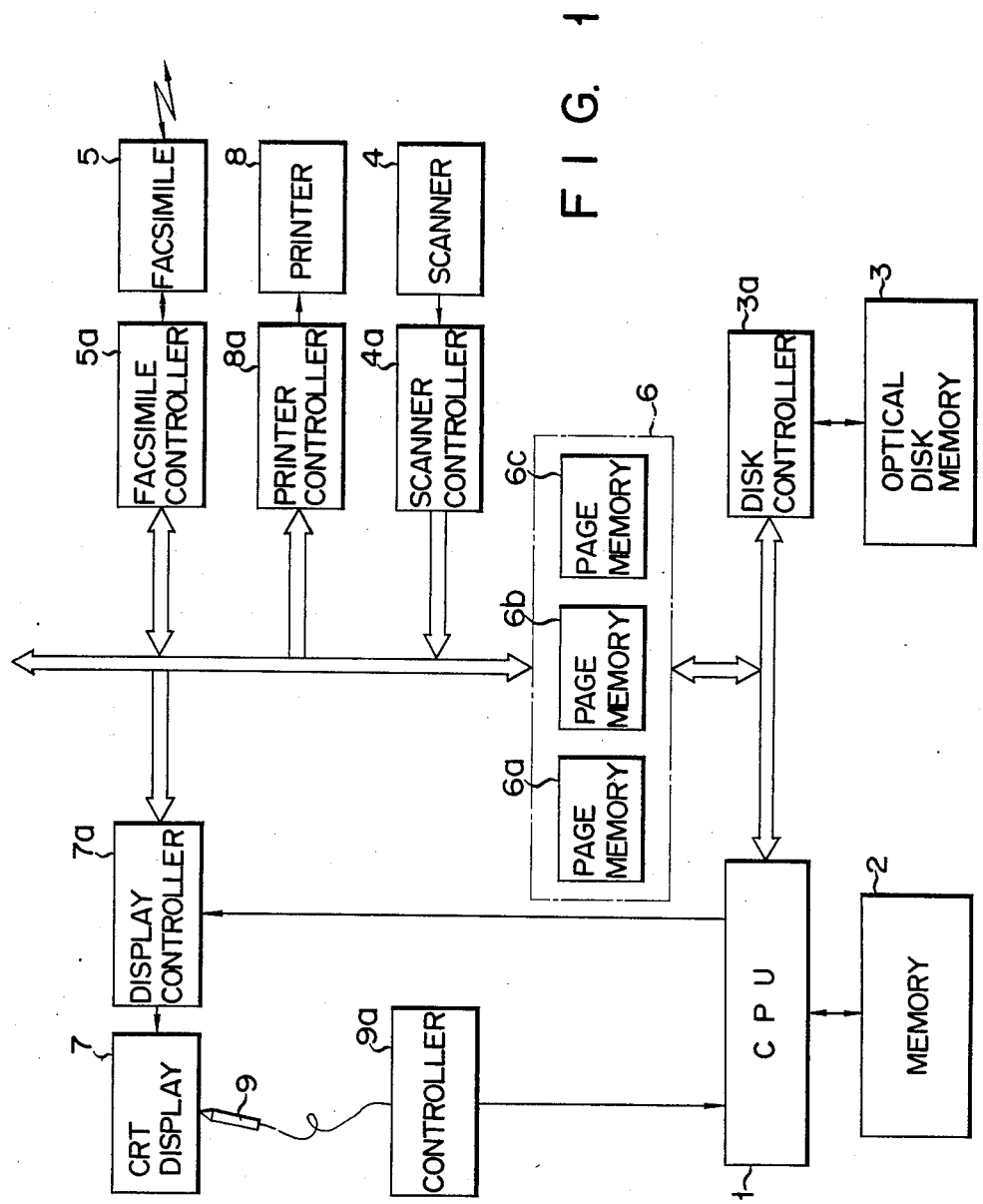
FIG. 1 is a block diagram of an image editing device embodying the present invention.

An electronic filing device according to an embodiment of the present invention will be described with reference to FIG. 1. Referring to FIG. 1, a CPU (Central Processing Unit) 1 controls input/output of image information and performs work menus such as image editing (cut, paste, region designation, transfer, enlargement, reduction, rotation, synthesis, delete), registration, printing, retrieval, storage, rearrangement, and disposal in accordance with a predetermined processing program stored in a memory 2. A large-capacity optical disk memory 3 stores various document image information under the control of the CPU 1. The writing and reading of information into and from the optical disk memory 3 is performed through a disk controller 3a.

Document image information input through a scanner 4 or a facsimile system 5 or document image information read out from the optical disk memory 3 is temporarily stored in a page memory device 6. The document image information stored in the device 6 is transferred to another system through the facsimile system 5, displayed on a CRT display 7, printed by a printer 8, or stored in the optical disk memory 3 under the control of the CPU 1. Input/output of document image information for the scanner 4, the facsimile system 5, the display 7, and the printer 8 is controlled by corresponding controllers 4a, 5a, 7a and 8a responsive to the CPU 1. The display 7 displays image information to be edited, and displays various command information supplied from the CPU for executing the work menus, as will be described later. A desired work menu is selected on the screen of the display 7 by a pointing device 9. Corresponding command information is fetched in the CPU 1 through a controller 9a. Input/output processing or editing processing of document information is performed in accordance with the command information. As in a conventional device of this type, when a desired point on the display is indicated with a light pen, the cursor is moved to the indicated position. Various processing can be performed by operating a keyboard under this condition.

The page memory device 6 has three page memories 6a, 6b and 6c in this embodiment. Each page memory has a different function. The page memory 6a stores document image information to be edited, the page memory 6b stores partial image information cut from the document image information stored in the page memory 6a, and the page memory 6c stores pasteboard image information as a pasteboard on which cut partial images are pasted. Locations of the memories 6b and 6c adapted for storing the partial image information are designated on the CRT screen by the pointing device 9.

IC memories, disk memories, magnetic memories or the like, or a combination thereof can be used as the page memory device 6. Furthermore, different areas of an IC memory can be used as page memories 6a, 6b and 6c.

Figure 2:
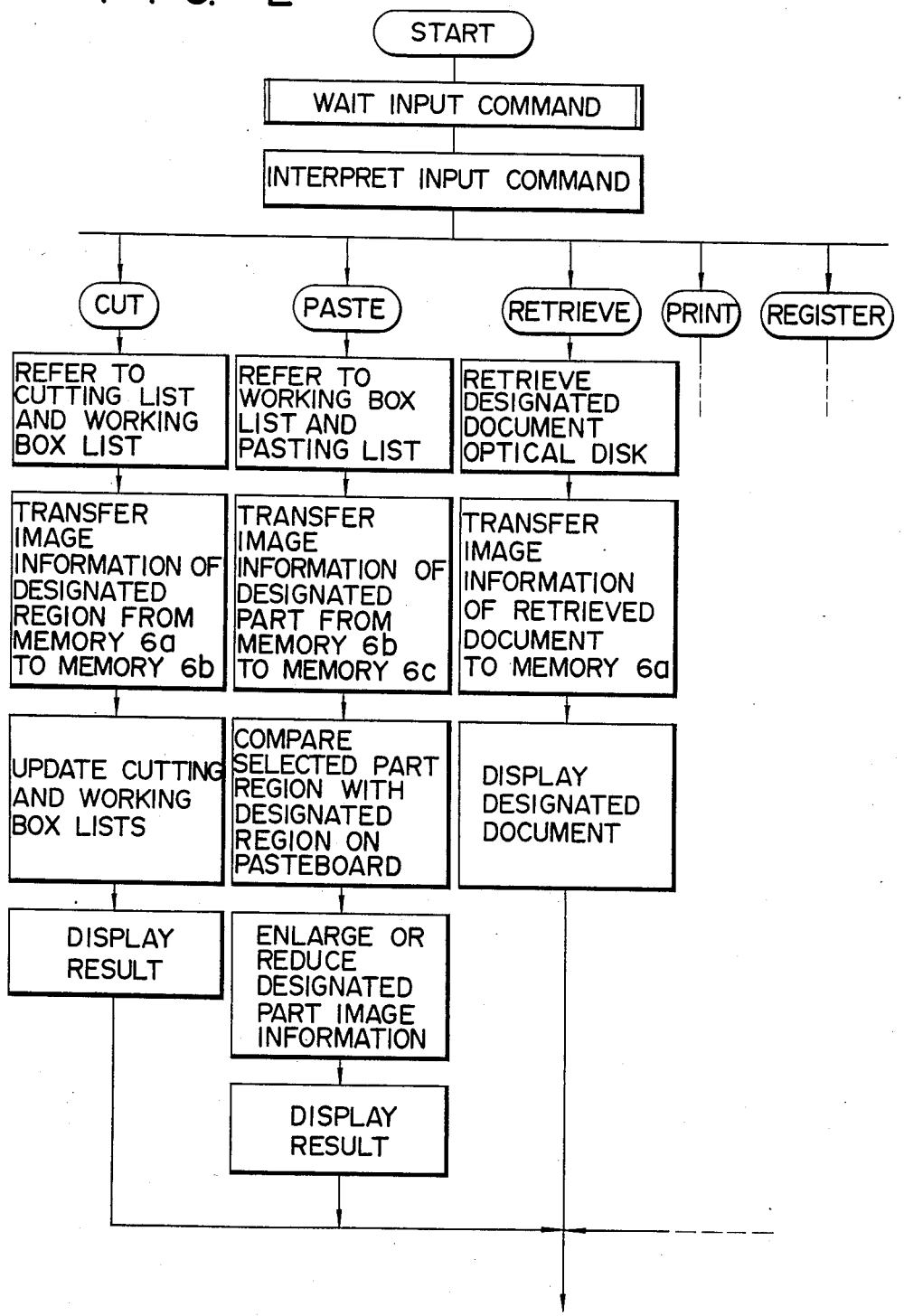
FIG. 2 is a flow chart of an editing processing program.

The CPU 1 performs editing processing in accordance with the processing program as shown in FIG. 2.

The operator selects a desired work menu with the light pen 9 on the CRT display 7. Command information corresponding to the selected work menu is fetched in the CPU 1 through the controller 9a. The CPU 1 executes selected processing in accordance with the input command. The editing processing programs are classified as follows.

One of the processings is document retrieval to search for documents to be edited. In this processing, the operator designates a document to be edited through the keyboard of the CPU 1. Then, the disk controller 3a retrieves the corresponding document and stores it in the page memory 6a. Alternatively, the CPU 1 stores in the page memory 6a document information received from the facsimile system 5 or the scanner 4 through each corresponding controller. In the editing processing mode, the screen of the CRT display 7 is divided into two display regions. A document stored in the page memory 6a by the disk controller 3 is displayed on the first display region of the CRT display 7.

The second processing is the cutting of partial images. Using the light pen, a partial image region of a desired size to be cut from the document information displayed in the first display region of the CRT display 7 is designated. The document information (working part) of the designated partial image region is stored in the page memory 6b (working box) and is displayed at the second display region. The cut partial images are displayed at the second display region in the order of cutting thereof. In this case, a cutting list including the names of the partial image regions, the coordinates of the regions, the document numbers, and the number (6a) of the page memory storing the image information of the cutting regions is prepared and stored in the memory 2. The list is updated every time a new partial image region is designated. Each part is controlled by the part name, document number and memory number in the cutting list. A working box list including the part names of the cutting regions, the coordinates of the second regions on the second display region, and the memory number storing the image information of the cutting regions is stored in the memory 2. The working box list is updated every time a partial image region is cut. The CPU 1 executes the editing processing referring to these lists.

In the cutting processing of partial images, the CRT display 7 displays a pasteboard prepared in the page memory 6c in the first display region. Using the pointing device 9, the operator designates the location of the first display region at which the partial image displayed on the second display region of the display 7 is to be pasted. In this case, a pasting list including the part names, the coordinates of the cutting regions, and the memory number (6c) is prepared and stored in the memory 2. Image information of the partial image is transferred to the designated location of the memory 6c and displayed in the designated location of the first display region of the display 7. In this case, the size and orientation of the partial image stored in the cutting list is compared with the size of the pasting region stored in the pasting list. When they are not coincident with each other in size or orientation, the image information of the cutting region is automatically enlarged or reduced, or rotated and stored in the page memory 6c.

Other processings include registration mode for printing the edited image information stored in the memory 6c through the printer 8, and storing the edited image in the optical disk memory 3.

Figure 3:
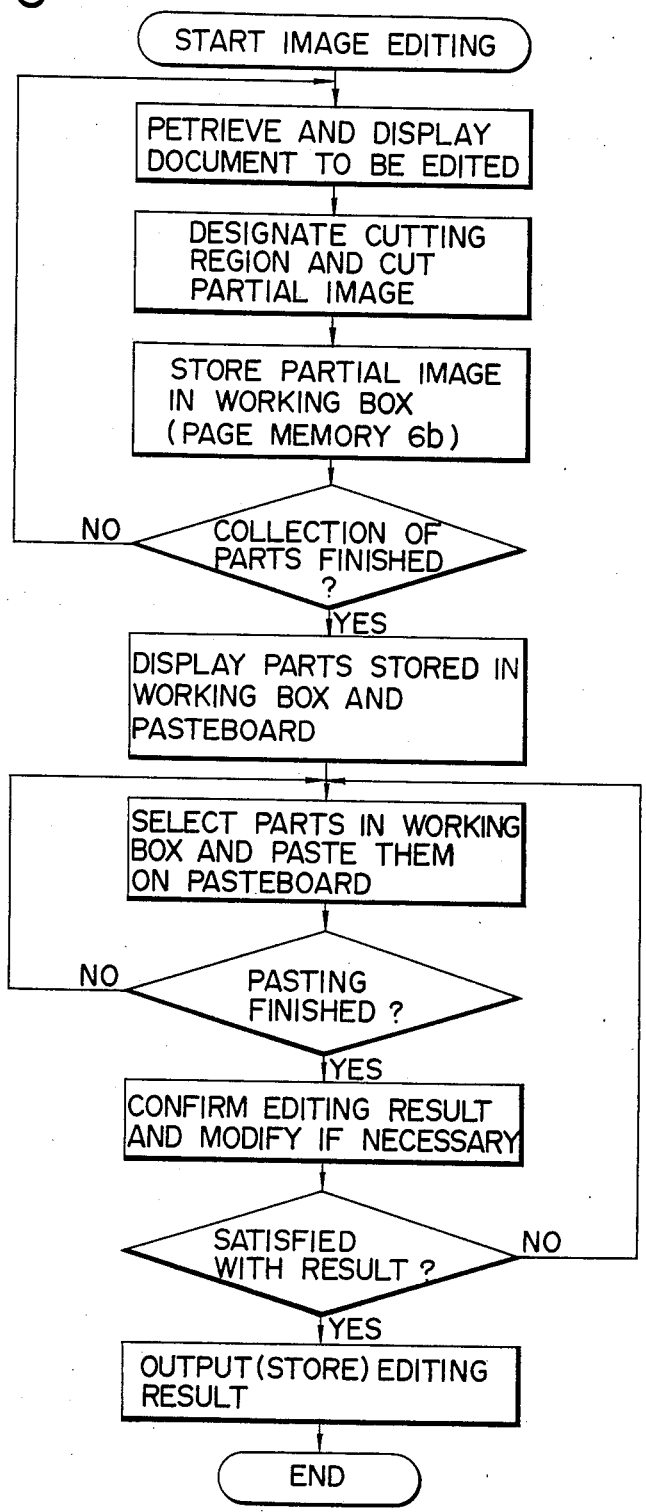
FIG. 3 is a flow chart of editing processing.

FIG. 3 shows the flow of editing processing of the electronic filing device having an editing function as described above. First, the operator designates the retrieval mode on the display 7 so as to retrieve a document to be edited and display the retrieved document image in the first display region of the display 7. Then, the operator designates the cutting mode on the display 7 so as to designate one or more partial images displayed on the first display region of the display 7 and to cut them. The cut partial image information is stored in the working box (memory 6b) and displayed in the second display region of the display 7. Other documents are sequentially retrieved and desired partial images are cut. After all the parts (partial images) to be edited have been stored in the working box, the operator designates the pasting mode on the display 7.

In the pasting mode, the parts stored in the working box 6b and the pasteboard image stored in the page memory 6c are displayed in the first and second display regions, respectively. The operator designates parts to be cut on the display and allows them to be displayed (pasted) at desired regions on the pasteboard. When a part or parts displayed on the pasteboard are to be enlarged or reduced in size or rotated, the operator designates the corresponding mode on the display. The pasting processing is performed until all the parts are pasted. After all the parts have been pasted in this manner, if there is a need to move one or more partial images to other positions, "move" is selected on the display and the parts are moved to the desired positions. The movement of partial images is carried out by transfer of the corresponding partial image information in the page memory 6C. When pasting of all the parts is completed in this manner and no other modification is required, registration of a synthetic image is designated. The output image is printed out by the printer 8 or stored in the optical disk memory 3.

Cutting/pasting editing of document images is completed by a series of processing procedures as described above. When some partial images stored in the page memory 6b must be pasted on another pasteboard to form another synthetic image, the other pasteboard is displayed on the display and new editing processing is performed.

The editing processing described above will be described with reference to transitions in the display screen of the display 7 shown in FIGS. 4A to 4L.

Figure 4A:
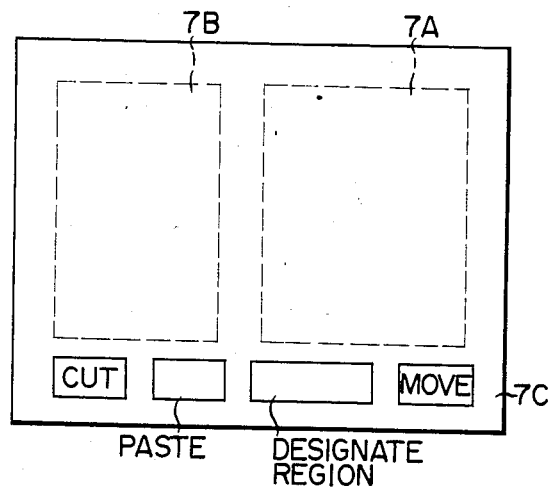
FIGS. 4A to 4L are illustrations for explaining the editing processing according to the present invention in accordance with transitions in the display screen.

The display screen of the display 7 is divided into a first display region 7A for displaying the document image to be edited, a second display region 7B for displaying cut partial images, and a display region 7C for displaying a plurality of editing commands, as shown in FIG. 4A. In the figure, only editing commands associated with "cut", "paste", "designate region" and "move" necessary for the description of editing processing are illustrated.

Figure 4B:
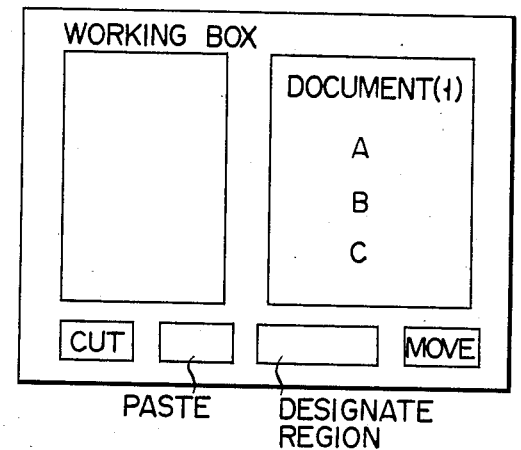
Figure 4C:
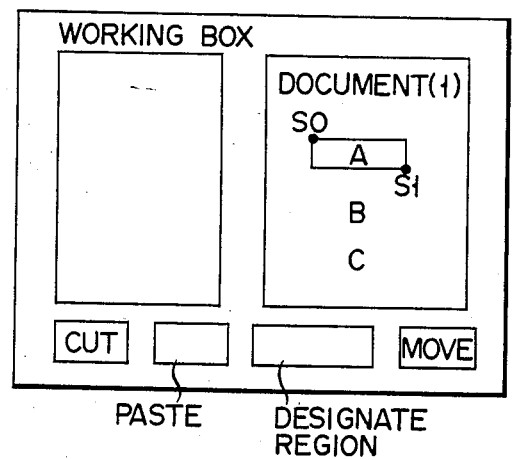

When the retrieval mode is designated on the screen of the display 7, a document (1) to be edited is displayed in the first display region 7A, as shown in FIG. 4B. In this state, the "designate region" mode is designated and the region of a document image (A) to be cut is designated. Each region is designated by designating two diagonal corners of a rectangular region of the partial image to be cut with the light pen, i.e., the cursor. The coordinates (S0, S1) of the two points are fetched in the CPU by operating the light pen.

Figure 4D:
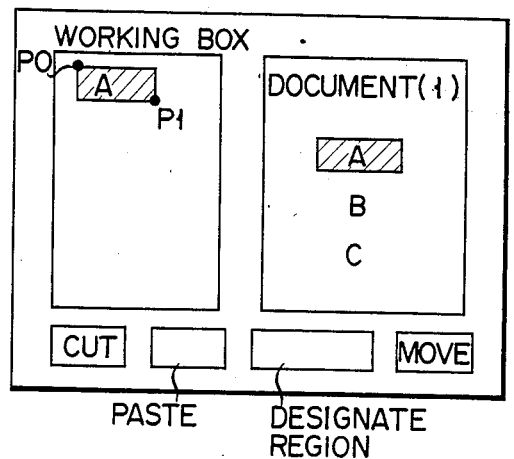
Figure 4E:
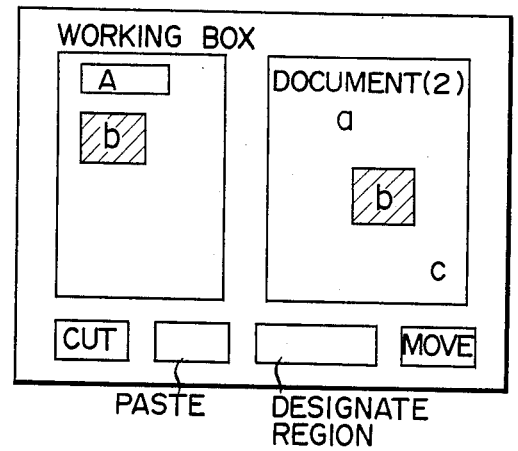
Figure 4F:
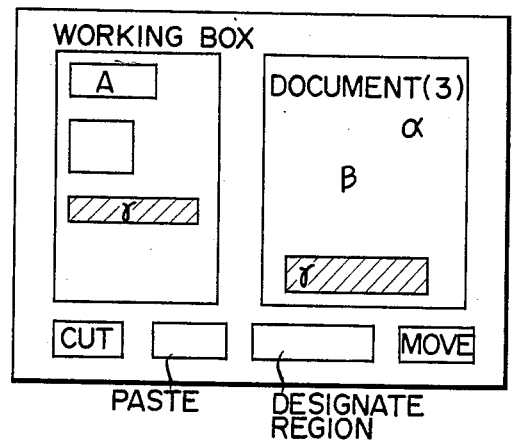

After the region is designated in this manner, as shown in FIG. 4D, the image information of the partial image region A is extracted, stored in a corresponding location of the page memory 6b, and displayed in the second display region 7B. Similarly, documents (2) and (3) are sequentially displayed, and partial images b and γ are designated and displayed in the second display region. The size of the cutting region in the first display region may be different from that of the display region in the second display region. In this case, the extracted image information is reduced or enlarged. The partial image displayed can be reduced or enlarged after being displayed in the second display region as needed.

Data of the partial image cut from the document image stored in the page memory 6a is stored in the cutting list, as shown in FIG 5A. Data of the document image stored in the page memory 6b is stored in the working box list, as shown in FIG. 5B. The regions of the partial images cut from the document image, the storing locations of the partial image information in the page memory 6b, and the display positions in the second display region 7B are controlled in accordance with these lists.

Figure 4G:
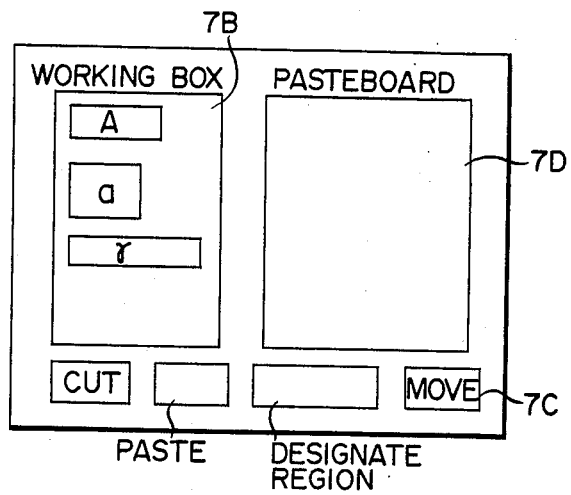

When all or some of the partial images to be edited are extracted, the first display region 7A of the display 7 is switched to a third display region 7D for displaying a pasteboard, as shown in FIG. 4G. In order to display a pasteboard image, a third display region may be provided independently of the first and second display regions. Separate display devices may be used as the first, second and third display regions.

Figure 4H:
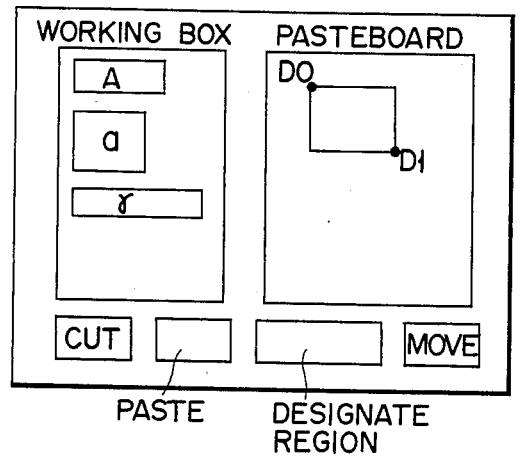
Figure 4I:
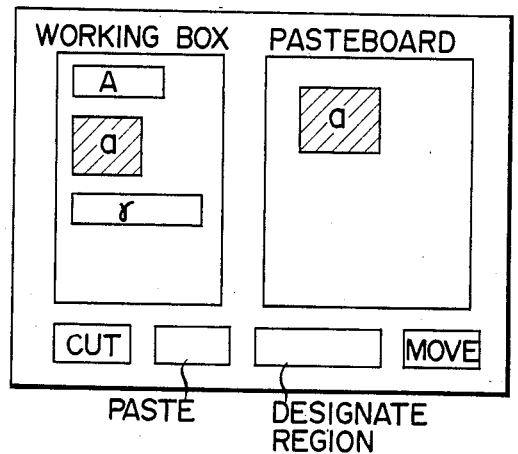
Figure 4J:
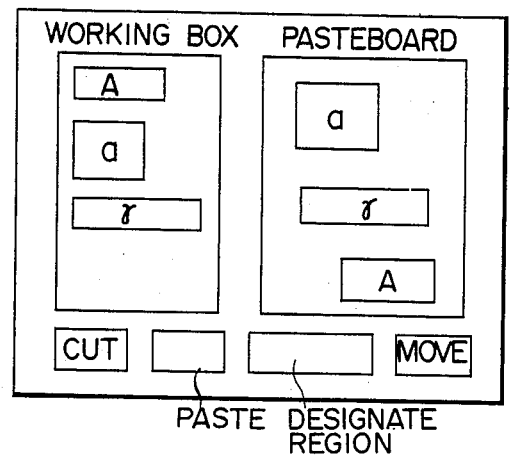

As shown in FIG. 4H, the "designate region" mode is selected, and a region on the pasteboard for pasting the partial image is designated by the coordinates (D0, D1) of the two diagonal corners of this region. The "paste" mode is then selected, and the partial image to be pasted in the pasting region is designated among the working box contents displayed in the first display region with the pointing device. At this time, as shown in FIG. 5C, a pasting list including the part names, the pasting regions in the first display region (storing location in the page memory 6c), and the number 6c of the page memory is prepared. The coordinate data is fetched as cursor position data in the CPU 1 through the controller 9a. Referring to this pasting list, the CPU 1 transfers the selected partial image information stored in the page memory 6b to the designated memory location in the page memory 6c. At this time, the size of the designated region on the pasteboard is compared with that of the selected partial image, and, if required, the size of the partial image to be pasted on the pasteboard is adjusted by enlargement or reduction. Similarly, the orientation of the designated region of the pasteboard image is compared with that of the selected partial image and, if necessary, the orientation of the partial image to be pasted on the pasteboard image is adjusted by rotation. Similarly, as shown in FIG. 4J, other partial images are pasted at selected positions on the pasteboard to form an edited image. The partial images can be reduced or enlarged, rotated or reversed on the display after pasting on the pasteboard as needed. When the operator wants no further modification of the synthetic image, it is registered.

Figure 4K:
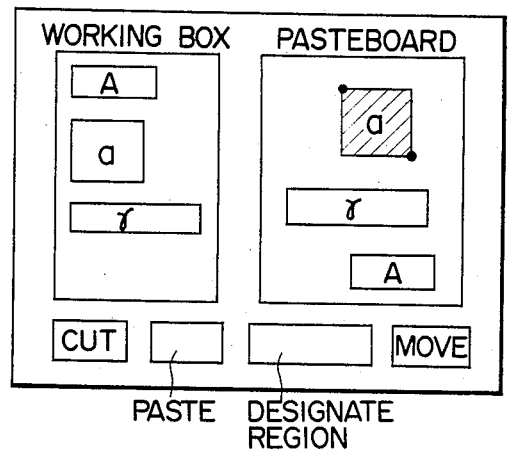
Figure 4L:
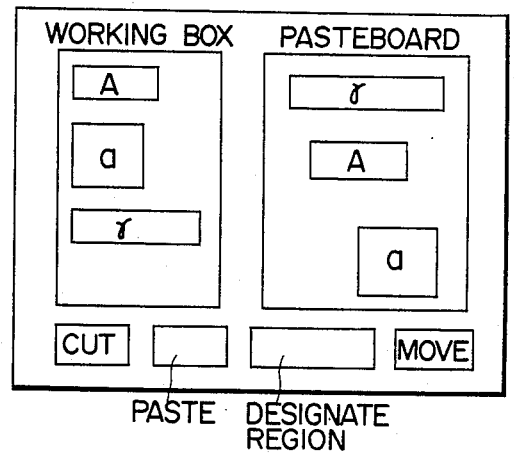

When the operator desires to modify the synthetic image, he designates the "move" mode as shown in FIG. 4K. A moving region for each partial image displayed on the pasteboard is designated, and the partial image information is transferred within the page memory 6c. As a result, all the partial images are moved to desired positions on the pasteboard, as shown in FIG.

4L. The layout of the edited image can be modified in the "move" mode, as needed. Of course, the layout of the edited image can also be modified by deleting a partial image or images which have become unnecessary or adding a new partial image or images.

When another edited image is to be formed or the edited image must be modified completely, another blank pasteboard or another document image as a pasteboard image can be displayed and the partial images can be repasted on the new pasteboard in accordance with another layout. In this case, since the required partial image information has been stored in the page memory 6b, the cutting processing need not be repeated.

Figure 6:
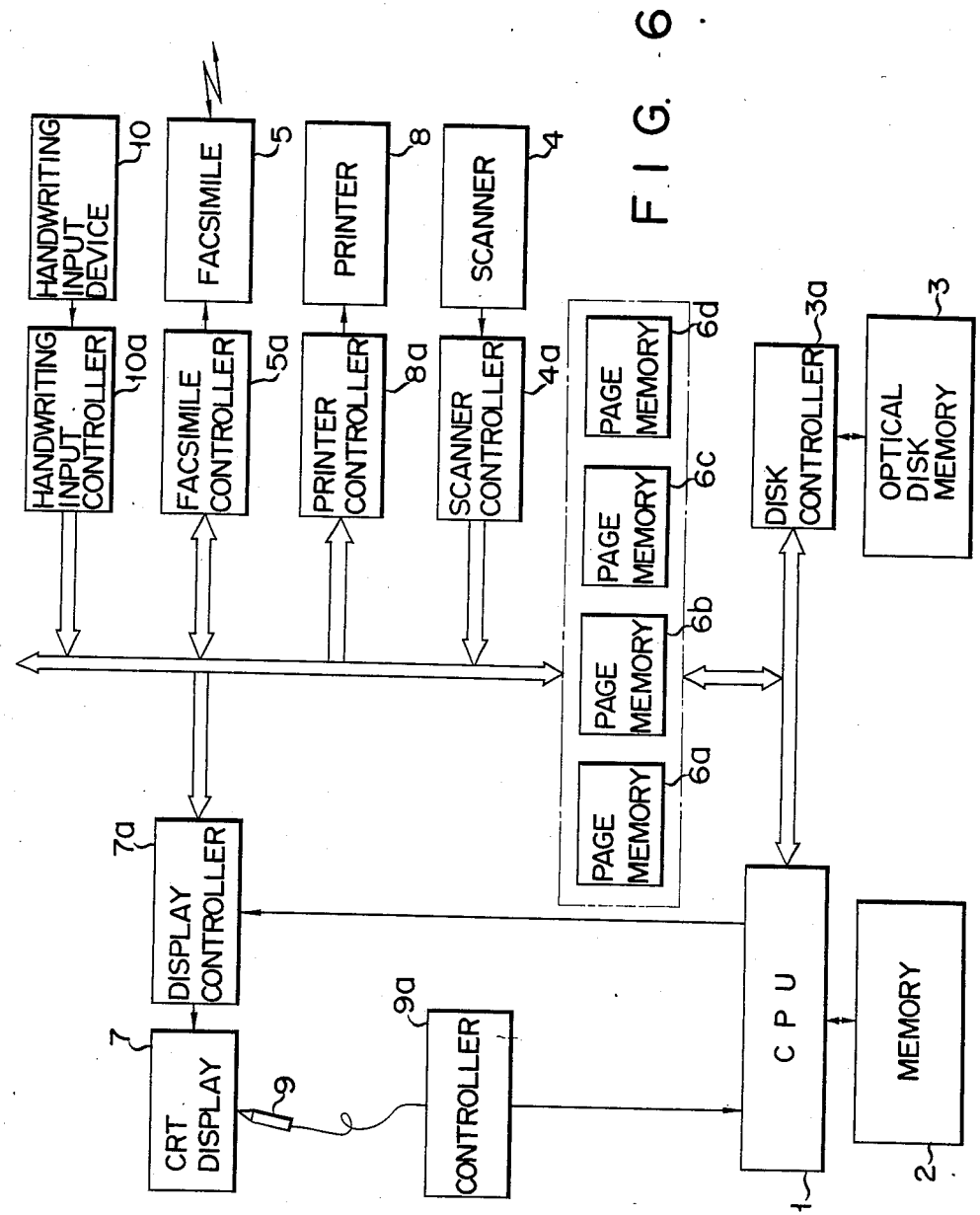
FIG. 6 is a block diagram of another embodiment of the present invention.
Figure 7A:
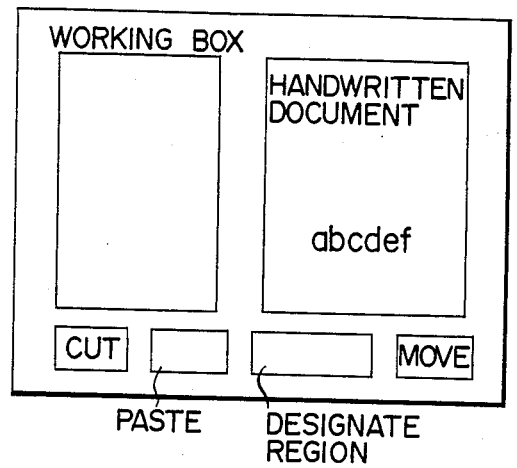
Figure 7B:
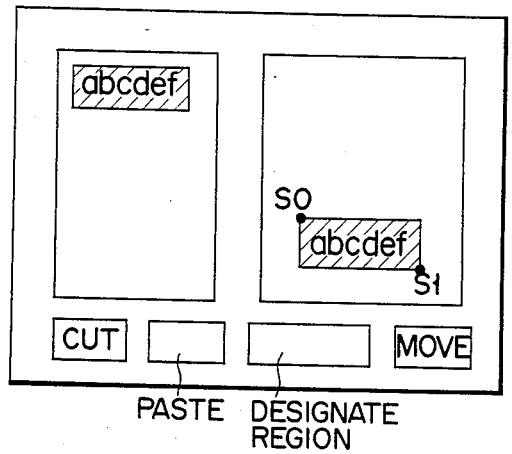
Figure 7C:
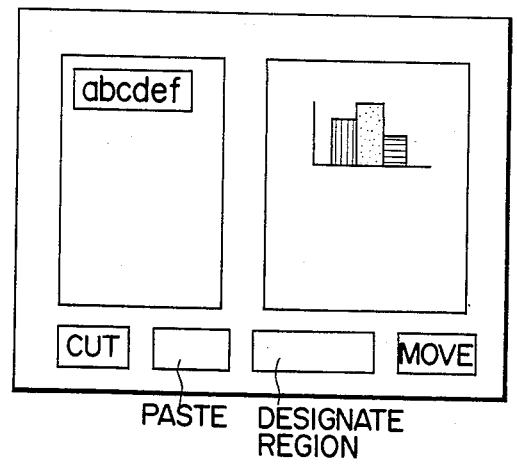

Another embodiment of the present invention will be described with reference to FIG. 6. The same reference numerals as in FIG. 1 denote the same parts in FIG. 6. The device of this embodiment has a handwriting input device 10 such as a tablet. The handwritten image information provided by the input device 10 is stored in a page memory 6d through a handwriting input controller 10a. Image information ("abcdef" in the illustrated case) provided by the input device 10 is, for example, stroke information consisting of time-serial coordinate data. The handwritten input image information is displayed in a designated region of the first display region of CRT display 7 as shown in FIG. 7A. A desired portion of the handwritten image is cut in accordance with the processing as described above. The image information (part) is stored in a designated area of page memory 6b and displayed in a region in the second display region. Textual, graphic or document (such as a ship) images handled by word processors and personal computers can be handled in a similar way. In this case, the images may be stored in a graphic code or ASCII code. For example, another required document image is displayed in the first display region as shown in FIG. 7C. A desired partial image (stored in a graphic code or ASCII code) is cut from the displayed document image by the method described above as shown in FIG. 7D. The cut image is stored in working box memory 6b and displayed in the second display region of the display 7. Then, the pasting processing is executed as shown in FIG. 7E. In this embodiment, a cutting list, a working box list and a pasting list are also prepared.

With this embodiment, the handwritten image information (stored in a bit-unit or a code) and graphic image information (stored in a graphic code or ASCII code) can be handled in the same manner as ordinary document image information (stored in a bit-unit), and more flexible image editing can be performed.

What is claimed is:

1. A document image editing device comprising:
    document providing means for providing documents to be edited having partial images to be cut;
    a page memory device having a first memory area adapted for storing information of the documents provided by said document providing means, a second memory area adapted for storing partial images cut from the documents to be edited, and a third memory area adapted for storing information of a pasteboard on which the partial images are pasted;
    a display device having a first display region adapted for individually displaying the documents stored in said first memory area of said page memory device, a second display region adapted for displaying partial images stored in said second memory area of said page memory device and cut from the documents displayed in said first display region, and a third display region adapted for displaying a pasteboard image which is stored in said third memory area of said page memory device and on which the partial images displayed in said second display region are to be pasted;
    output means for outputting the pasteboard image information stored in said third memory area of said page memory device;
    region designating means for designating a region of a partial image to be cut in the document displayed in said first display region of said display device, and a region for pasting the partial image in said third display region; and
    a processing unit, responsive to said region designating means, for transferring, in a cutting mode of editing processing, image information of the designated partial image region in said first display region of said display device, from said first memory area of said page memory device to a location of said second memory area which corresponds to the designated region in said second display region of said display device, and for transferring, in a pasting mode, image information displayed in said second display region of said display device, from said second memory area of said page memory device to said third memory area of said memory device which corresponds to the designated pasting region in said third display region of said display device.

2. A device according to claim 1, wherein said display device has first and second divided display sections, and displays, in the cutting mode, the document images to be edited and the cut partial images in said first and second display sections and displays, in the pasting mode, the pasteboard image and the cut partial images in said first and second display sections.

3. A device according to claim 1, wherein said display device displays editing commands each indicating an operation mode of editing processing, and said processing unit switches the operation mode of editing processing in response to designation of the editing command by said region designating means.

4. A device according to claim 1, wherein said memory device has separate memories as said first, second and third memory areas.

5. A device according to claim 1, further comprising a handwriting image information input device, and said page memory device has a fourth memory area for storing handwritten image information from said handwriting image information input device, the handwritten image information being displayed in said first display region of said display device.

6. A device according to claim 1, wherein designation of the cutting region of the partial image in said first display region of said display device, the display region of the partial image in said second display region, and the pasting region in said third display region is performed in accordance with coordinates of two diagonal points of each region.

* * * * *